Patented July 6, 1937

2,086,384

UNITED STATES PATENT OFFICE 2,086,384

PROCESS OF RECOVERING GOLD, SILVER, AND RARE METALS

Lorena C. Lady, Rogers, Ark., assignor of one-half to Elisha L. Lady, Hot Springs, Ark.

No Drawing. Application June 25, 1935, Serial No. 28,385

4 Claims. (Cl. 75—108)

This invention relates to the class of metallurgy and pertains particularly to improvements in the processes of recovering precious and rare metals.

Numerous processes have heretofore been proposed and some have been carried out for the recovery of suspended gold and other precious and rare metals from sea water in which it is known that such metals exist, but so far as is known, no attempts have been made or no successful processes have been made known for removing gold, silver and other precious and rare metals from fresh water which rises to the surface from great depths and which carries such metals either in suspension in an indistinguishable state or in molecular solution. Hot springs and other deep springs having surface outlets as well as the water always found associated with gold mines, contain large quantities of these precious and rare metals such as gold, silver, platinum, rhodium, palladium and others, but heretofore no successful method has been devised for extracting the same.

The present invention has for its principal object to provide a process whereby the suspended minerals described and other mineral substances may be obtained from the waters of these subterranean springs and from the waters removed from gold mines.

Another object of the invention is to provide a process as above stated, which is relatively simple and which is economically feasible.

In carrying out the present process, use is made of a solution of iron chloride containing iron oxide suspended therein. This preparation is combined with the water bearing the metals to be recovered and the salts are caused to gel and precipitate by the addition of ammonia water thereto.

It is known that an iron salt has previously been used in a process for the recovery of gold by the addition of this salt to a solution of the gold with a cyanide or in aqua regia and the precipitation or gelling of the salt by the addition of ammonia to the solution so that the dissolved gold will be carried down with the gel and may then be recovered therefrom. In such a process the gold is first dissolved and then thrown out of solution by the iron and ammonia. It is not known, however, that a combination of iron chloride and iron oxide has been used for the recovery of gold and silver from solutions of the same obtained from natural sources and experiment has shown that it is impossible to obtain the gold and silver present in these natural solutions or waters by any of the known processes or by the use of iron chloride or iron oxide alone and the subsequent addition of ammonia to the solution. Only when these chemicals are mixed together with the natural water containing the metals, can the metals be obtained therefrom.

Recovery of gold and silver from the natural underground waters can be obtained in accordance with the present invention, in the following manner:

Approximately 1 pint more or less of a 50% aqueous mixture of the combined iron chloride and iron oxide is placed in a receptacle of suitable capacity and 1,000 gallons of the gold bearing solution is added thereto. To this mixture 1 pint more or less of aqua ammonia (50% dilution of the 28% solution) is added which effects the flocculation of the iron salts and the formation of a gel which settles or precipitates in the receptacle. This formation of a gel extracts and carries down with it gold and silver particles which may be present in the water. The precipitate is then recovered in any suitable manner as by the use of a centrifuge and it is then treated in any of the usual well-known ways for recovering gold and silver from such precipitates. It is not believed necessary to go into a description of any particular method for removing the gold and silver from the precipitate as such methods are well-known to those versed in the art.

While the method above outlined results in the extraction of large quantities of gold and silver from deep well waters which have heretofore baffled all attempts to remove these metals which are known to be combined therewith, a slight increase in the amount of the metals may be obtained by combining mercurous cyanide and sodium hydroxide with the iron chloride and iron oxide mixture and this combination of chemicals has the added virtue of effecting the removal with the gold and silver of rarer metals such as rhodium, palladium, platinum and the like, and also results in the precipitation of a number of alkalies such as sodium, potassium, magnesium and calcium.

While it is believed that other methods of combining the specified chemicals with the metal bearing natural water may be employed with satisfactory results, the method followed at present is as follows:

A stock liquid containing the chemicals is made up by adding to 1 gallon of ordinary well water 2 pounds of iron chloride and 2 pounds of iron oxide. This gives approximately a 50% mixture of the combined chemicals. To this mixture is added 1 ounce of mercurous cyanide and 1 pint of 5% solution of sodium hydroxide or caustic soda.

In carrying out the process by using all of the chemicals of the liquid approximately 1 pint more or less of this stock liquid is mixed with each 1,000 gallons of the gold bearing water and to this is added 1 pint more or less of a 50% dilution of stronger aqua ammonia. This results in the formation of a gel which when removed by means of a centrifugal separator is recovered as a black mud. This is then treated in any of the usual manners for the removal of the gold and silver and other rare metals therefrom as, for example, by cupelling the mass with lead which results in the formation of a silver button containing the gold and other metals in the center thereof.

It is well known that there are no gold mines in the Ozark Mountains of Arkansas, nevertheless, the treatment of waters obtained from certain hot springs of these mountains by the process herein described resulted in a yield of approximately 1 milligram of gold for each gallon of water which means that the approximate amount of gold brought to the surface of the ground by some of these springs where the rate of flow has been determined amounts to approximately 1 ounce per hour.

While the cyanide of mercury has been specifically set forth and the formula given specifies sodium hydroxide, it is believed that other cyanides might be effectively employed and also that the hydroxide of potassium may be used with satisfactory results.

What is claimed is:—

1. The process set forth of recovering gold and silver from natural mineral water which comprises the preliminary step of mixing iron chloride and iron oxide with the water and subsequently precipitating the gold and silver with the iron chloride and iron oxide as a gel by the addition of ammonia.

2. The process of recovering gold and silver from waters in which it is dissolved or suspended by processes of nature, consisting in treating such water with chloride and oxide of iron together, then precipitating the chloride and oxide of iron in the form of a gel by the addition of ammonia to the water, the said gel formation carrying down the metals with it, then removing the precipitated gel, and finally recovering the metals from the precipitate by any of the usual known methods.

3. The process of treating natural precious and rare metal bearing waters for the recovery of the metals, which comprises mixing with the water iron chloride, iron oxide, mercury cyanide and sodium hydroxide, then adding aqua ammonia to effect the formation and precipitation of a gel by which the desired constituents of the water are extracted therefrom, collecting the precipitate and finally recovering the metals therefrom in any of the usual known methods.

4. The process of treating natural precious and rare metal bearing waters for the recovery of the metals, which comprises mixing with the water iron chloride, iron oxide, a cyanide and a caustic alkali, then adding aqua ammonia to effect the formation and precipitation of a gel by which the desired constituents of the water are extracted therefrom, collecting the precipitate and finally recovering the metals therefrom in any of the usual known methods.

LORENA C. LADY.